(12) United States Patent
Mori et al.

(10) Patent No.: US 7,853,065 B2
(45) Date of Patent: Dec. 14, 2010

(54) FLUID MEASURING SYSTEM AND FLUID MEASURING METHOD

(75) Inventors: Michitsugu Mori, Tokyo (JP); Hideaki Tezuka, Tokyo (JP)

(73) Assignee: The Tokyo Electric Power Company, Incorporated, Tokyo (JP)

( * ) Notice: Subject to any disclaimer, the term of this patent is extended or adjusted under 35 U.S.C. 154(b) by 936 days.

(21) Appl. No.: 10/594,761

(22) PCT Filed: Mar. 31, 2005

(86) PCT No.: PCT/JP2005/006384

§ 371 (c)(1),
(2), (4) Date: Jan. 16, 2007

(87) PCT Pub. No.: WO2005/095994

PCT Pub. Date: Oct. 13, 2005

(65) Prior Publication Data

US 2007/0272007 A1    Nov. 29, 2007

(30) Foreign Application Priority Data

Mar. 31, 2004  (JP) ............... 2004-102162
Jul. 9, 2004    (JP) ............... 2004-203988

(51) Int. Cl.
*G06K 9/00* (2006.01)
*G06K 9/68* (2006.01)
(52) U.S. Cl. .................. 382/141; 382/218
(58) Field of Classification Search ........... 382/141, 382/218, 274; 73/170.01, 170.11; 359/850
See application file for complete search history.

(56) References Cited

U.S. PATENT DOCUMENTS

| 4,842,384 | A | * | 6/1989 | Mercado ............ 359/648 |
| 4,934,801 | A | * | 6/1990 | Mercado ............ 359/355 |
| 5,249,238 | A |   | 9/1993 | Komerath et al. |
| 5,561,515 | A | * | 10/1996 | Hairston et al. .......... 356/28 |
| 6,473,243 | B1 | * | 10/2002 | Omura .............. 359/730 |

FOREIGN PATENT DOCUMENTS

DE    100 38 460 A1    2/2002

(Continued)

OTHER PUBLICATIONS

U.S. Appl. No. 11/632,284, filed Jun. 12, 2007, Mori, et al.
U.S. Appl. No. 12/091,754, filed Apr. 28, 2008, Mori, et al.
U.S. Appl. No. 10/594,633, filed Sep. 28, 2006, Mori, et al.

(Continued)

*Primary Examiner*—Daniel G Mariam
(74) *Attorney, Agent, or Firm*—Oblon, Spivak, McClelland, Maier & Neustadt, L.L.P.

(57) ABSTRACT

A fluid measurement system includes a long focus optical system at a CCD camera, and an image processing means for comparing particle images taken at two time points for analysis. The system further includes a high-pass filter for leaving high frequency components at a predetermined frequency and higher from the luminance signal of the image, so that a turbulence structure occurring in the fluid to be measured is extracted, and the turbulence structure is captured and its image is taken. Therefore, the flow field of an inaccessible fluid to be measured can be analyzed.

16 Claims, 13 Drawing Sheets

| FOREIGN PATENT DOCUMENTS | | |
|---|---|---|
| ES | 2 107 954 A1 | 12/1997 |
| JP | 6 66823 | 3/1994 |
| JP | 7 5188 | 1/1995 |
| JP | 2002-90471 | 3/2002 |
| JP | 2003 84005 | 3/2003 |

OTHER PUBLICATIONS

C. E. Towers, et al., "Application of particle image velocimetry to large-scale transonic wind tunnels", Optics & Laser Technology, vol. 23, No. 5, XP-022601830, Oct. 1, 1991, pp. 289-295.

* cited by examiner

S1 — INPUT "DISTANCE TO FLUID TO BE MEASURED"

S2 — INPUT ROUGH "MAXIMUM FLOW VELOCITY Vmax (m/s)" OF FLUID TO BE MEASURED

S3 — CALCULATE AND DISPLAY "FOCAL LENGTH f OF OPTICAL SYSTEM" SO THAT MOVING DISTANCE BETWEEN TWO IMAGES RANGES FROM ABOUT 5 PIXELS TO ABOUT 100 PIXELS (OR ABOUT 5 % TO ABOUT 10 % OF TOTAL NUMBER OF PIXELS)

S4 — SET OPTICAL SYSTEM

S5 — MEASUREMENT OF FLOW FIELD

ORIGINAL IMAGE

APERTURE 140 mm
(CENTER SHIELD RATE OF 0 %)

APERTURE 140 mm
(CENTER SHIELD RATE OF 35 %)

APERTURE 140 mm
(CENTER SHIELD RATE OF 50 %)

ORIGINAL IMAGE

APERTURE 140 mm
(CENTER SHIELD RATE OF 0 %)

APERTURE 140 mm
(CENTER SHIELD RATE OF 35 %)

APERTURE 140 mm
(CENTER SHIELD RATE OF 50 %)

APERTURE 70 mm
(CENTER SHIELD RATE OF 0 %)

F I G. 8

F I G. 9
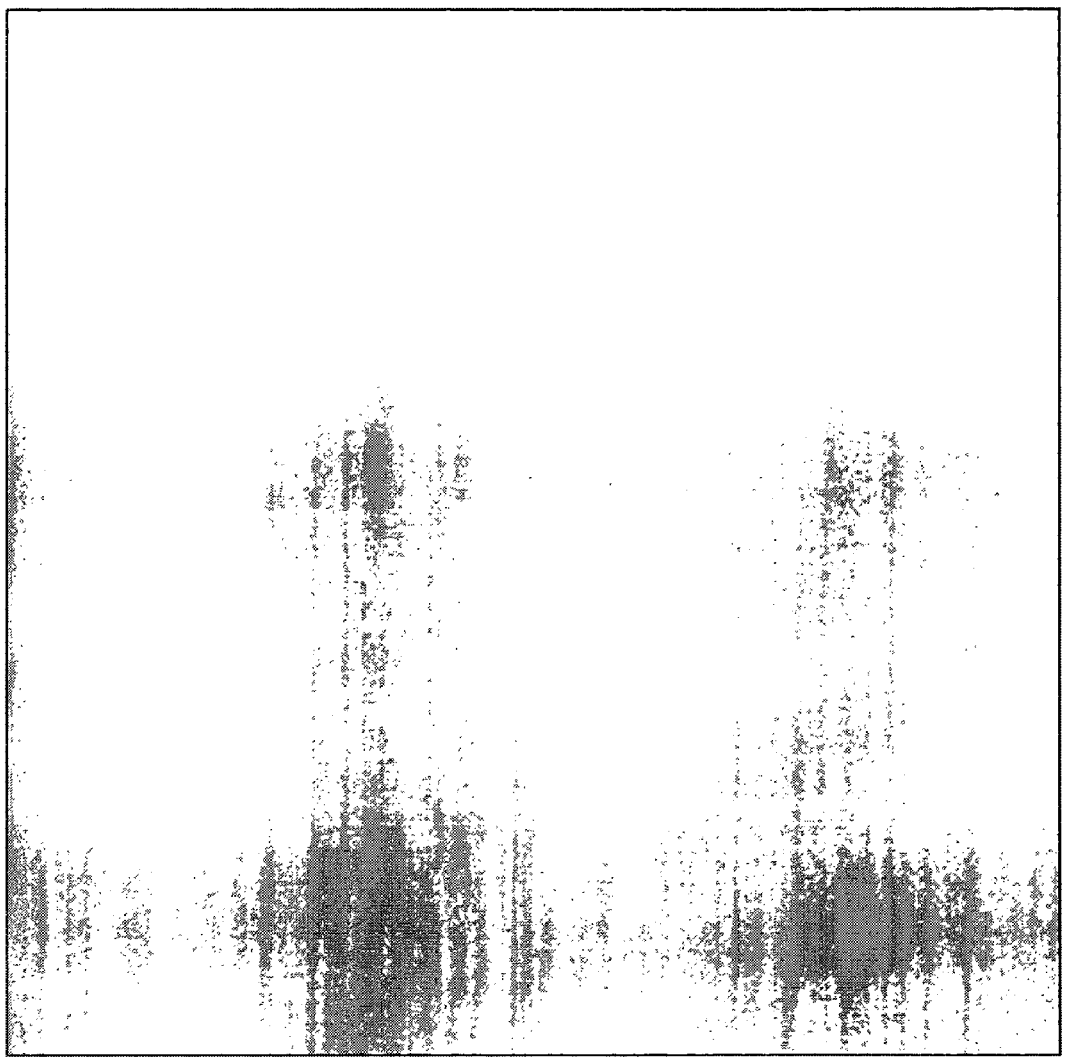

FLUID MEASURING SYSTEM AND FLUID MEASURING METHOD

TECHNICAL FIELD

The present invention relates to a fluid measurement system and a fluid measurement method each for analyzing the flow field of a distant fluid to be measured.

BACKGROUND ART

As a system for observing, for example, smoke exhausted from a chimney of a power station or the like, technologies disclosed in Patent Document 1 and Patent Document 2 are known. These technologies use a plurality of ITVs or color cameras to detect the presence or absence of smoke exhausted from the chimney using parallax and color difference between the cameras.

Patent Document 1: Japanese Patent Application Laid-open No. S63-88428
Patent Document 2: Japanese Patent Application Laid-open No. H10-232198

DISCLOSURE OF THE INVENTION

Problem to be solved by the Invention

As for smoke exhausted from a chimney of a power station and the like, water vapor, volcanic ash, yellow sand and so on, it is desired to detect the flow such as the velocity and direction of the flow of the smoke and the like in order for operation control of the power station and the like, prediction of the effect on its ambient environment and so on. By the technologies disclosed in Patent Document 1 and Patent Document 2, however, only the presence or absence of smoke or the like can be detected.

On the other hand, recently, a Particle Image Velocimetry (hereinafter referred to as "PIV") such as an image correlation method and a Particle Tracing Velocimetry (PTV) is known which measures the flow of a complex flow field with high accuracy and precision by processing particle images. For example, a laser light is inputted in a sheet form into the flow field of the fluid to be measured to form a laser sheet so that particle images on the laser sheet at two time points are taken, and their luminance pattern distributions are compared to each other to measure the flow velocity and the direction of the fluid. However, PIV is only used mainly for analysis of the flow field of fluid in a closed space, such as analysis of the flow field of liquid such as water, oil and so on, analysis of the flow field of combustion, and analysis of the flow field by wind tunnel experiment around a moving object such as an automobile or the like. In other words, the conventional PIV has been developed merely for a short distance, a distance to the fluid to be measured of about 1 meter, that is, for a so-called laboratory, and it is desired to use PIV at a practical level.

The present invention has been developed in consideration of the above viewpoints, and its object is to provide a fluid measurement system and a fluid measurement method each capable of detecting the flow of a distant fluid to be measured such as smoke exhausted from a chimney, water vapor, volcanic ash, yellow sand and so on to provide a new application of PIV at a practical level.

Means to solve the Problem

To achieve the above-described object, the inventors first focused attention on use of a long focus optical system. On the other hand, if the distance to the fluid to be measured is long, a plurality of particle images may be included in one pixel of the imaging means, in which case the moving amount of each particle image cannot be obtained. Hence, the inventors focused attention on extraction of a turbulence structure (a cluster composed of a vortex or a flow structure similar to a vortex) of the fluid to be measured to reach completion of the present invention.

Namely, the invention provides a fluid measurement system including an imaging means for taking images of particles contained in a fluid to be measured at small time intervals, and an image processing means for comparing luminance pattern distributions at a plurality of consecutive time points obtained by the imaging means to measure a moving direction and a moving amount of a particle group, and analyzing a flow field of the fluid to be measured, the imaging means including a long focus optical system being of a long distance type capable of imaging a fluid to be measured a long distance away, and the system including a turbulence structure extraction means for extracting a turbulence structure of the fluid to be measured from the particle images obtained by the imaging means, wherein the image processing means measures a moving direction and a moving amount of the extracted turbulence structure to analyze the flow field of the fluid to be measured.

The invention provides the fluid measurement system described above, wherein the turbulence structure extraction means includes a spatial frequency transformation means for transforming the image taken by the imaging means to spatial frequency components of luminance, a high-pass filter for leaving high frequency components at a predetermined frequency and higher from the transformed frequency components, and an image transformation means for transforming the frequency components after the filtering processing by the high-pass filter to an image.

The invention provides the fluid measurement system described above, wherein the turbulent extraction means further has means for applying a window function to a signal of the image taken by the imaging means.

The invention provides the fluid measurement system described above, wherein Blackman window is used as the window function.

The invention provides the fluid measurement system described above, further including a difference calculation means for obtaining, from the luminance pattern distributions at the plurality of consecutive time points obtained by the imaging means, a difference between the luminance pattern distributions at the plurality of consecutive time points as a difference luminance pattern distribution, wherein the image processing means analyzes the flow field of the fluid to be measured using the difference luminance pattern distributions at a plurality of consecutive time points obtained by the difference calculation means.

The invention provides the fluid measurement system described above, wherein the imaging means is of a long distance type capable of imaging a luminance pattern distribution by natural light reflection in the fluid to be measured a long distance away.

The invention provides the fluid measurement system described above, further including a laser light input means for inputting a laser light in a sheet form into the fluid to be measured, wherein the imaging means is of a long distance type capable of imaging a luminance pattern distribution by the laser light reflection in the fluid to be measured a long distance away.

The invention provides the fluid measurement system described above, wherein the imaging means is of a long distance type capable of imaging the fluid to be measured 10 m or greater and 20 km or less away from the set position of the imaging means.

The invention provides a fluid measurement method, including the steps of:

taking images of particles contained in a fluid to be measured a long distance away at small time intervals by an imaging means including a long focus optical system, comparing luminance pattern distributions of particle images at a plurality of consecutive time points obtained by the imaging means to measure a moving direction and a moving amount of a particle group; and analyzing a flow field of the fluid to be measured from the moving direction and the moving amount of the particle group, the method including the step of extracting a turbulence structure of the fluid to be measured and measuring the moving direction and the moving amount of the extracted turbulence structure to analyze the flow field of the fluid to be measured, when the number of particles contained in one pixel of the particle image obtained by the imaging means is plural.

The invention provides the fluid measurement method described above, wherein the step of extracting a turbulence structure of the fluid to be measured includes the steps of transforming the image taken by the imaging means to spatial frequency components of luminance, performing filtering processing to leave high frequency components at a predetermined frequency and higher from the transformed frequency components, and transforming the frequency components after the filtering processing to an image.

The invention provides the fluid measurement method described above, wherein the step of extracting a turbulence structure of the fluid to be measured further includes the step of applying a window function to a signal of the image taken by the imaging means.

The invention provides the fluid measurement method described above, further including the step of imaging a luminance pattern distribution by natural light reflection in the fluid to be measured, and analyzing the flow field of the fluid to be measured.

The invention provides the fluid measurement method described above, further including the steps of inputting a laser light in a sheet form into the fluid to be measured, imaging a luminance pattern distribution by the laser light reflection in the fluid to be measured, and analyzing the flow field of the fluid to be measured.

The invention provides the fluid measurement method described above, further including the steps of imaging the fluid to be measured 10 m or greater and 20 km or less away from the set position of the imaging means, and analyzing the flow field of the fluid to be measured.

The invention provides the fluid measurement method described above, further including the step of analyzing the flow field of smoke, volcanic ash, water vapor, yellow sand, crowd, pollen or air 10 m or greater and 20 km or less away from the set position of the imaging means, as the fluid to be measured.

EFFECT OF THE INVENTION

The present invention includes a long focus optical system and an image processing means for comparing particle images taken at two time points for analysis, thereby allowing the flow field of an inaccessible fluid to be measured to be analyzed to provide a new application of the PIV system at a practical level.

Further, when the present invention is configured to include a high-pass filter for leaving high frequency components at a predetermined frequency and higher from a luminance signal of an image, a turbulence structure occurring in the fluid to be measured can be extracted, so that the turbulence structure is captured and the PIV method is applied to it, whereby a more distant fluid to be measured can be analyzed in natural light.

Further, the present invention includes means for extracting a turbulence structure of the fluid to be measured, whereby when a plurality of particle images are included in one pixel of the imaging means, the flow field of the fluid to be measured can be analyzed by measuring the moving direction and the moving amount of the extracted turbulence structure.

BRIEF DESCRIPTION OF DRAWINGS

FIG. 8 is a view showing an original image of exhaust smoke being a fluid to be measured in Test Example 2;

FIG. 9 is an image of a turbulence structure showing the image filtered by the high-pass filter and then inversely transformed in Test Example 2;

BEST MODE FOR CARRYING OUT THE INVENTION

Figure 1:
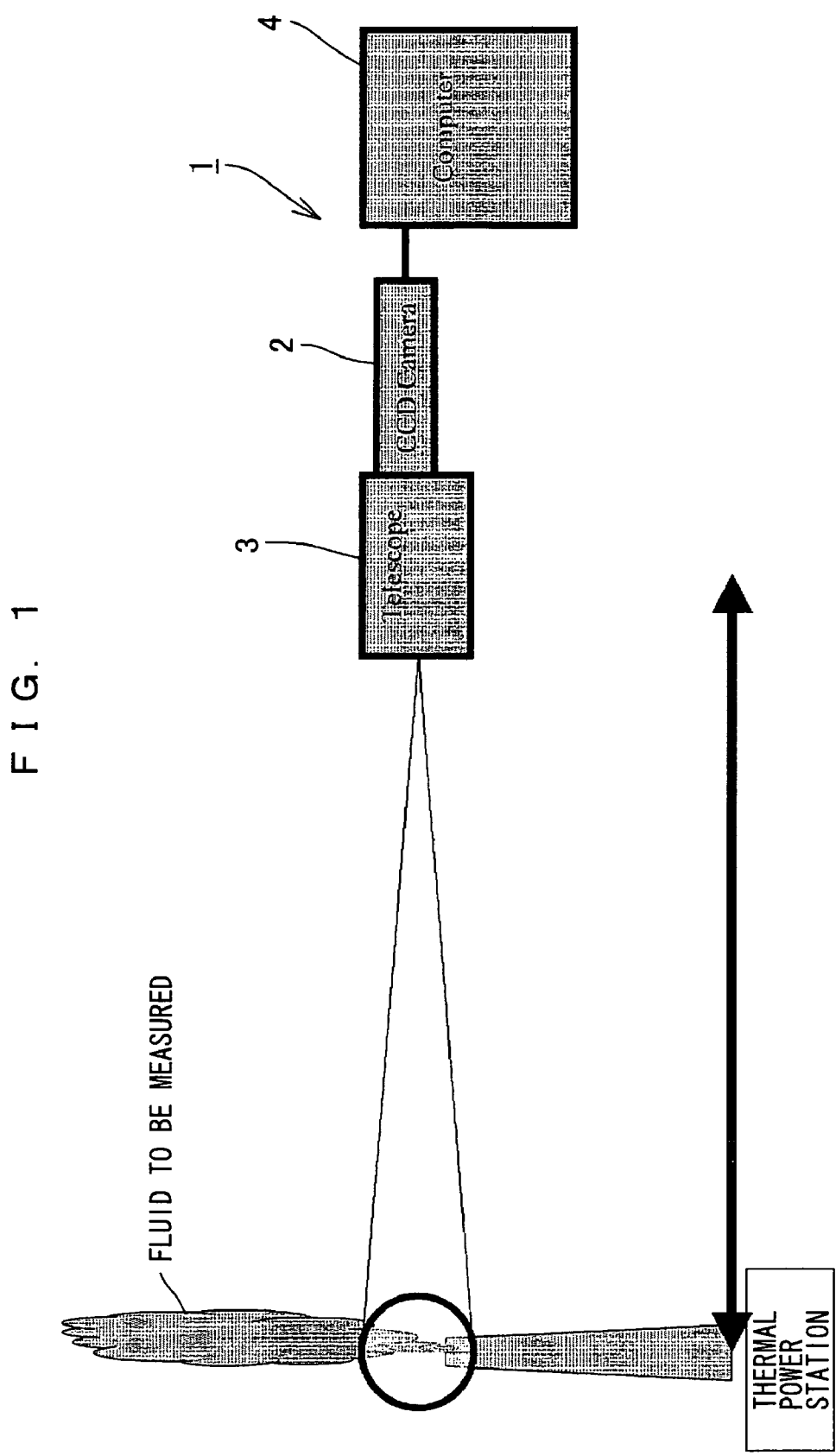
FIG. 1 is a diagram showing the outline of a fluid measurement system according to an embodiment of the present invention.

Hereinafter, embodiments of the present invention will be described in more detail with reference to the drawings. FIG. 1 shows a fluid measurement system 1 according to an embodiment of the present invention, which comprises a CCD camera 2 including a long focus optical system 3 as an imaging means, a computer 4, and so on.

The CCD camera 2 is equipped with the long focus optical system 3, and a single focus lens (hereinafter, referred to as a "single lens") is preferably used as the long focus optical system 3. In this case, it is more preferable to provide a turret to form a configuration so that a plurality of kinds of single lenses can be selected. The use of the turret also allows automatic selection from among the single lenses. A lens with a zoom function generally has a disadvantage in a large field curvature, but such a lens can be used as long as it is made of glass with a high refraction index to be able to present a stable image. Note that although the camera (CCD camera) including a CCD image sensor is used as the imaging means in this embodiment, a camera can be used instead which includes a CMOS image sensor.

Besides, any of Newtonian, Cassegrain, or other telescopes can be used as an optical telescope constituting the long focus optical system 3. Further, a secondary mirror is supported by a secondary mirror support member (spider) in a lens barrel, and when a particle image is enlarged, light beams in the shape of a cross or the like due to the spider are projected and overlap the particle image to make discrimination difficult. Hence, it is preferable to support the secondary mirror by parallel plate glasses whose surfaces are disposed to be oriented in a direction perpendicular to the optical axis of a main mirror in the lens barrel, instead of the spider in the shape of a cross or the like which has been conventionally used. The parallel plate glasses can reduce reflection of light to decrease the projection of the light beams which will be noise. Note that it is preferable to form the parallel plate glasses from an optical glass.

Figure 2:
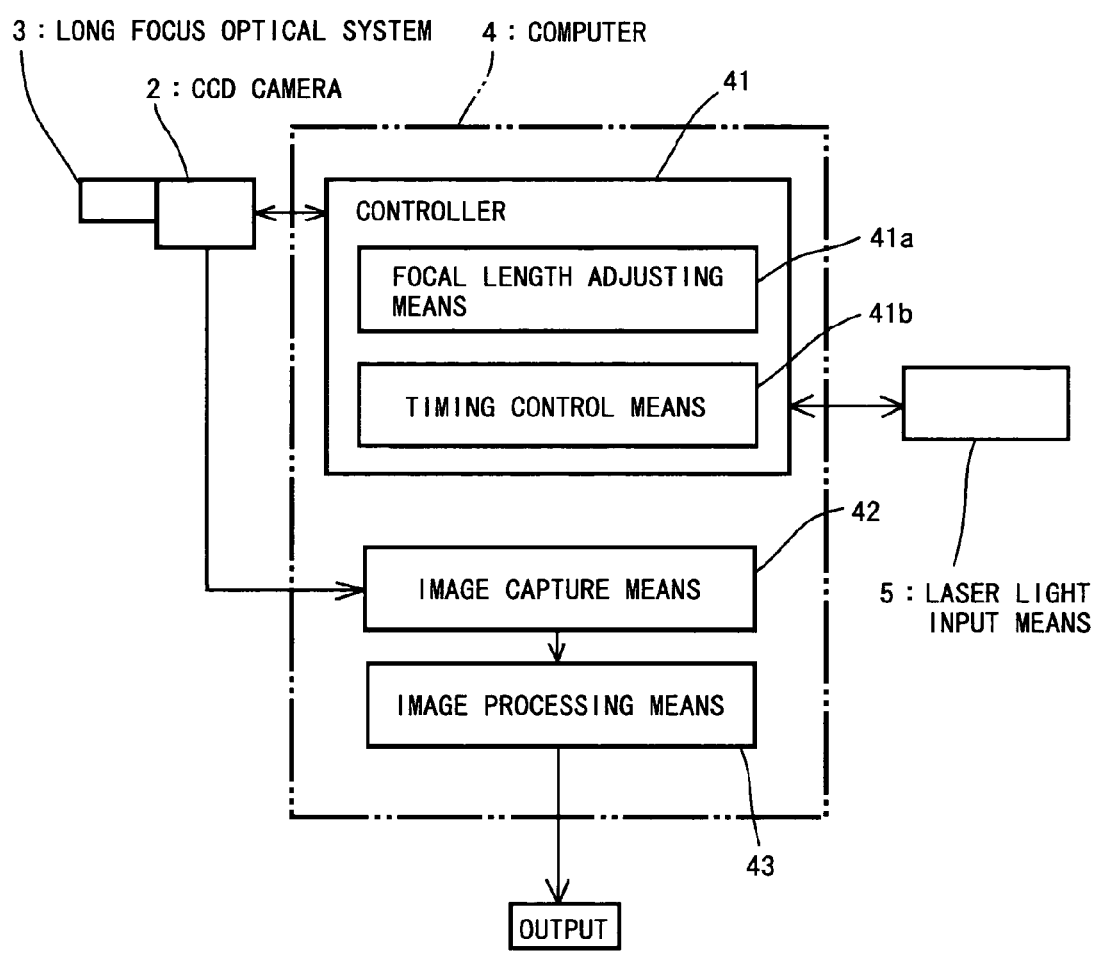
FIG. 2 is a block diagram showing a schematic configuration of a computer of the fluid measurement system according to the above embodiment.

As shown in FIG. 1 and FIG. 2, the computer 4 is connected to the CCD camera 2 and comprises a controller 41 for controlling drive of the CCD camera 2, an image capture means 42 for receiving a signal of the image taken by the CCD camera 2 and performing predetermined processing on the signal, and an image processing means 43. The controller 41 comprises a focal length adjusting means 41a as a computer program for calculating an appropriate focal length f of the CCD camera 2 whose details will be described later. The image capture means 42 comprises a frame grabber board for digitizing the analog image signal from the CCD camera 2. The image processing means 43 analyzes, by the PIV method, the image frame being the digital image signal outputted from the frame grabber board. Note that it is also possible to provide a circuit for correcting the distortion aberration of the image at the stage previous to the image processing means 43.

The image processing means 43 recognizes particle images taken at two subsequent time points taken by the CCD camera 2 with a small time interval therebetween as distributions of luminance patterns, and analyzes the two particle images by comparison to estimate the amount of movement of a particle group. More specifically, it is assumed that the value at a certain point in the particle image is taken as a luminance value and the luminance values distributed within a predetermined region in the particle image are recognized as the luminance pattern, so that the image processing means 43 obtains the similarity between the luminance patterns by the cross-correlation method or the gray level difference accumulation method so as to obtain the moving amount and the moving direction of the particle group on pixels between the two images. The image processing means 43 obtains the actual flow velocity and the direction of the flow of the fluid to be measured through use of the moving amount and the moving direction on pixels of the particle group and a small time interval $\Delta t$ to analyze the flow field.

In obtaining the moving amount and so on of the particle group by the analysis by the image processing means 43, if the particle groups in the predetermined luminance patterns within the particle images at the two time points are separated too far, it is impossible to recognize the correlation between them. Accordingly, it is preferable that the moving distance of the particle group falls within a range of about 0.5% to about 10% of the total number of pixels in the longitudinal or transverse direction (for example, 5 pixels to 100 pixels in the case of the total number of pixels in the longitudinal (or transverse) direction is 1000). On the other hand, an object of the present invention is to analyze the flow field of a distant fluid to be measured a long distance away from the CCD camera 2 being the imaging means, and thus the CCD camera 2 is equipped with the long focus optical system 3. Whether or not the moving amount of the particle group falls within the aforementioned range depends on the focal length f of the long focus optical system 3 as well as on the imaging time interval $\Delta t$ between two time points and on a distance L to the fluid to be measured.

Therefore, the above-described focal length adjusting means 41a of the controller 41 performs calculation to find an appropriate focal length f to allow the moving distance of the particle group between the particle images at the two time points obtained by the image processing means 43 to fall within the abovementioned range. In particular, the following relational expressions (1) and (2) are used to find the set number of moving pixels of the particle group between the particle images at the two time points set within the aforementioned range and the focal length f corresponding to the set number of moving pixels.

$$\text{Set number of moving pixels} = (V \times \Delta t)/D \quad (1)$$

$$D = (f/L) \times \text{const} \quad (2)$$

Incidentally, V represents the temporary velocity of the fluid to be measured, $\Delta t$ represents the imaging time interval between two consecutive time points, D represents the size of the image projected per pixel, and L represents the distance from the set position of the imaging means to the fluid to be measured. In addition, const represents a constant obtained from experiments and is a value obtained by actually placing a scale at the position of the fluid to be measured and measuring what number of pixels the unit length of the scale (for example, 1 mm) corresponds to. Note that when L is about 20 m or greater, it is not necessary to place the scale at the position matching the value of L, but the scale is placed at an arbitrary position of about 20 m or greater to measure what number of pixels the unit length of the scale corresponds to, in order to obtain the constant.

According to the expression (2), the size D of the image projected per pixel and the focal length f can be recognized to be in a linear proportion to find the appropriate focal length f corresponding to the number of moving pixels which falls within the aforementioned range. The reason why the size D of the image projected per pixel and the focal length f can be recognized to be in a linear proportion is that the distance L to the fluid to be measured is long. By adjusting the focal length f as described above, an appropriate long focus optical system 3 can be selected in a short processing time.

Note that if the distance L to the fluid to be measured is short, the relation between the size D of the image projected per pixel and the focal length f is non-linear, which case can be dealt with by setting a non-linear table indicating the correlation between them. Incidentally, a telecentric optical system can also be used to recognize them as being in a linear proportion as in the above case for calculation.

The above-described focal length adjusting means 41*a* obtains the distance L to the fluid to be measured by measurement by a predetermined method to determined the temporary velocity V of the fluid to be measured, and uses the above-described relational expressions to select a long focus optical system 3 having the focal length f corresponding to the distance L and the temporary velocity V. More specifically, the focal length adjusting means 41*a* derives an appropriate focal length f by calculation and thus can obtain it easily and in a short processing time. It is also possible to configure such that the CCD camera 2 is temporarily equipped with an arbitrary long focus optical system 3, the long focus optical system 3 is used to measure the image of the fluid to be measured at two time points, and the image processing means 43 analyzes a temporary flow field so that a long focus optical system 3 having the appropriate focal length f is selected depending on whether or not the obtained number of moving pixels of the particle group falls within the aforementioned predetermined range.

Note that as for the method of measuring the distance L to the fluid to be measured, it can also be calculated by a method of directly measuring the object such as a chimney or the like using a laser distance meter or a telemeter, or by the relation between positional information of the set position (longitude and latitude) of the CCD camera 2 obtained from GPS and the position (longitude and latitude) of the object. It is also possible to specify the set position of the CCD camera 2 and the position of the object on a map to calculate the distance L between them.

Further, depending on the distance to the fluid to be measured, it is also possible to use a laser light input means 5 to input a laser light in a sheet form into the fluid to be measured so that the CCD camera 2 takes an image. In this case, as shown in FIG. 2, a timing control means 41*b* is provided in the controller 41 of the computer 4 which synchronizes oscillation of the laser light by the laser light input means 5 and drive of the CCD camera 2.

Figure 3:
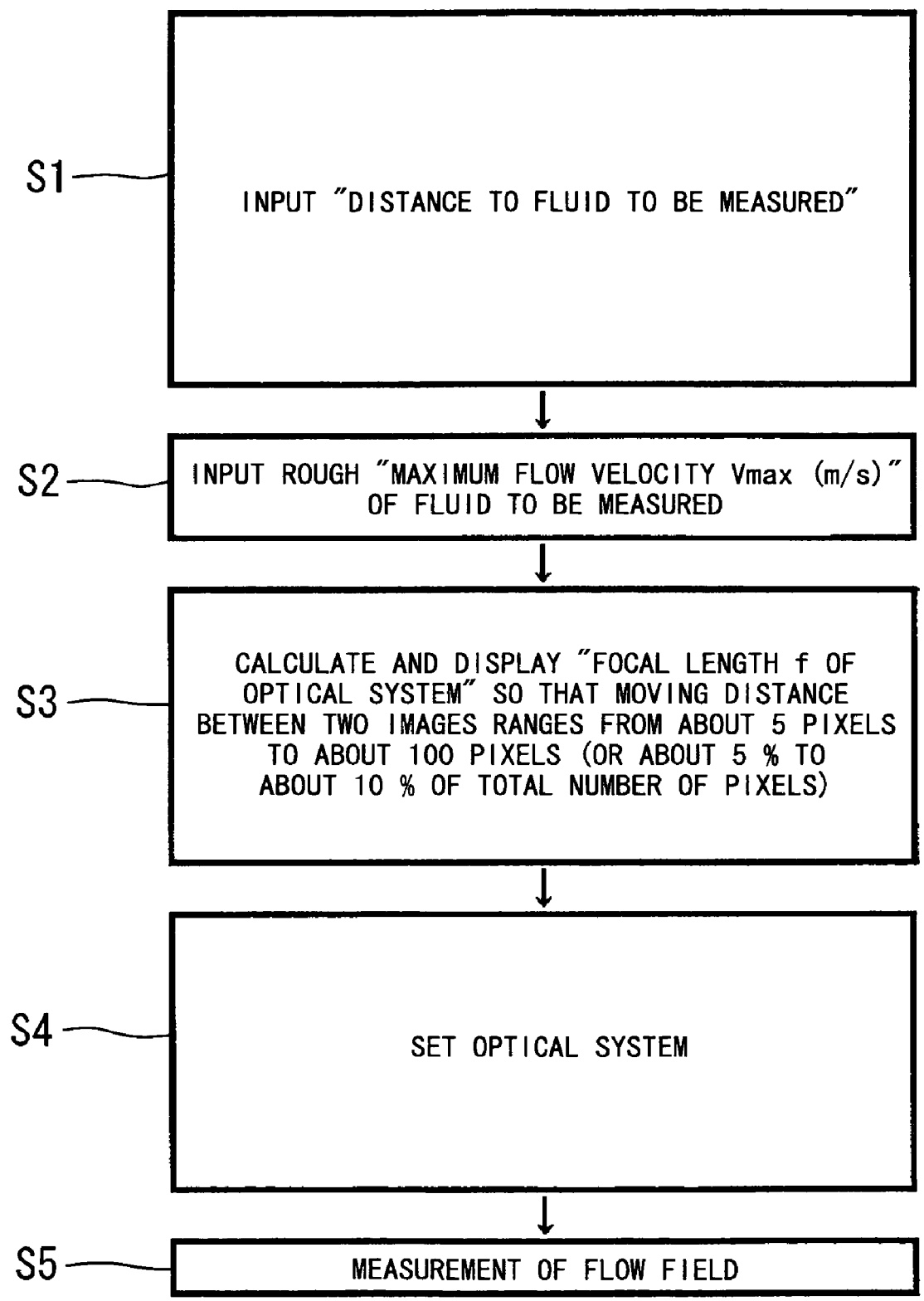
FIG. 3 is a chart illustrating an example of a fluid measurement method using the fluid measurement system according to the above embodiment.

A method of determining the long focus optical system 3 by the focal length adjusting means 41*a* will be concretely described here with reference to FIG. 3.

First of all, the CCD camera 2 is set at a predetermined position. Next, an input means of the computer 4 is used to input the distance L from the CCD camera 2 to the fluid to be measured which is measured through use of the laser distance meter or the like as described above (S1). Then, the flow velocity V (maximum flow velocity Vmax) of the fluid to be measured is inputted (S2). The flow velocity V is a temporary value for selecting the long focus optical system 3 having the appropriate focal length f as described above, which may be an arbitrary value. However, in order to make the moving distance between the two images obtained by the image processing means 43 range from about 0.5% to about 10% of the total number of pixels in the longitudinal or transverse direction as described above in a short operation time, it is preferable to input the maximum flow velocity Vmax of the fluid to be measured. For example, for the case of smoke exhausted from a chimney or the like, the maximum flow velocity Vmax can be used which is found by a calculated value based on specifications of a blower for blowing the smoke. The actual maximum flow velocity of the smoke exhausted from the chimney or the like is lower than the calculated value because of pressure drop or the like in the chimney flow passage and generally never exceeds the calculated value. As a matter of course, if the specifications of the blower cannot be specified or if volcanic ash or the like is measured, a rough maximum flow velocity Vmax is inputted referring to the empirical values or the like.

After the distance L to the fluid to be measured and the temporary flow velocity (maximum flow velocity Vmax) are determined, the focal length adjusting means calculates the focal length f corresponding to them using the above-described relational expressions (1) and (2) (S3). In this event, the imaging time interval Δt between the particle images at two time points for use in the calculation is preferably as short as possible to keep the obtained number of moving pixels of the particle group falling within the aforementioned range. Generally, the interval is set within 1/60 s to 1/30 s.

After the focal length f is determined as described above, a long focal optical system 3 corresponding thereto is selected (S4). For the single lens, for example, the turret is rotated to set it on the CCD camera 2, or for the one with the zoom mechanism, zoom is adjusted so that the laser light is inputted from the laser light input means 5 in a sheet form to take particle images at two time points. Note that it is also possible to adjust the flange focal distance corresponding to the focal length f obtained by the focal length adjusting means 41*a* to take the images.

Each of the taken images is transformed by the frame grabber board being the image capture means 42 into a digital signal, and the image processing means 43 obtains the flow velocity, the flow direction and so on of the actual flow field of the fluid to be measured from the moving amount and the moving direction between the luminance patterns in the particle images (S5).

Figure 4:
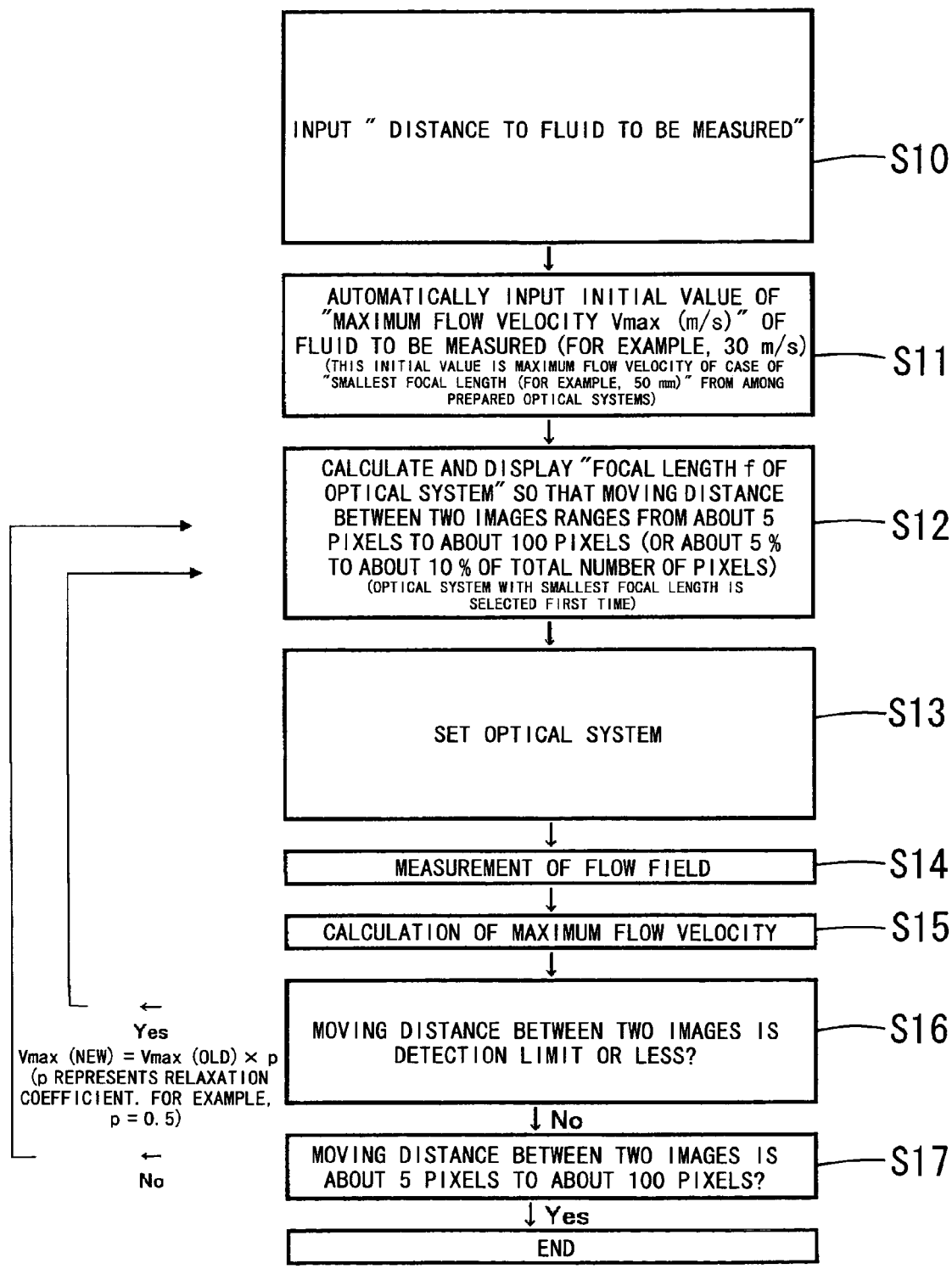
FIG. 4 is a chart illustrating another example of the fluid measurement method using the fluid measurement system according to the above embodiment.

While the case where the rough value of the maximum flow velocity Vmax of the fluid to be measured is manually inputted is explained in the above description, FIG. 4 is a flowchart for explaining the measurement method using the above-described fluid measurement system in the case where the value is automatically inputted instead of manual input.

As shown in this chart, the point that the distance L to the fluid to be measured is inputted automatically or manually is the same as in the above case (S10), but the maximum flow velocity Vmax inputted in the next step is determined taking an appropriate flow velocity as the initial value. More specifically, a maximum flow velocity Vmax (for example, 30 m/s) which can be measured even by a long focus optical system 3 having the shortest focal length f, for example, a focal length of 50 mm from among a plurality of kinds of long focus optical systems 3 prepared as those capable of being set in the CCD camera 2 is automatically inputted (S11).

A focal length f satisfying the above-described expressions (1) and (2) is calculated using the distance L to the fluid to be measured and the automatically inputted maximum flow velocity Vmax (S12). Then, a long focus optical system 3 corresponding to the calculated focal length f is selected and set in the CCD camera 2 (S13). The flow field is measured similarly to the above (S14). In this example, the maximum flow velocity Vmax is calculated from the analyzed result (S15), and whether or not the moving distance between the two images is the detection limit or less, that is, the number of moving pixels is less than one is judged (S16). Generally, such a situation does not occur, but if the automatically selected maximum flow velocity Vmax is too large as compared to the actual flow velocity, the two images are completely the same, so that it is impossible to analyze the flow field (the maximum flow velocity in step S15 cannot be obtained), and hence this step is preferably provided for just in case. If the number of moving pixels is less than one, a new maximum flow velocity Vmax to be used in the relational expressions (1) and (2) is calculated by Maximum flow velocity Vmax(new)= maximum flow velocity Vmax(old)×$p$ (p representing an arbitrarily defined relaxation coefficient, for example, p=0.5)
to find again the focal length f satisfying the relational expressions (1) and (2) to repeat the above-described steps S12 to S16.

If the number of moving pixels is one or more, whether or not the moving distance (the number of moving pixels) between the two images is about 0.5% to about 10% of the total number of pixels of the image sensor in the longitudinal or transverse direction (for example, 5 pixels to 100 pixels in the case where the total number of pixels in the longitudinal (or transverse) direction is 1000), is checked (S17). If the above condition is not satisfied, the maximum flow velocity Vmax found in step S15 is used, and the process returns to step S12 to select a long focus optical system 3 again. When the condition is satisfied, the result is outputted, and the measurement is completed.

In the particle image taken by the PIV method here, it is necessary that one particle extends across two or more pixels of the CCD image sensor, and it is more preferable that one particle extends across two to five pixels. When a distant fluid to be measured is imaged via the long focus optical system 3, the number of particles contained in one pixel is large, and therefore it is difficult or impossible to analyze the behavior of each one of particles from the images at two time points. Hence, the following turbulence structure extraction means is provided in this embodiment. More specifically, the turbulence structure extraction means is configured such that it calculates the spatial frequency of luminance about the image captured by the image capture means 42, includes a high-pass filter for leaving high frequency components at a predetermined frequency and higher from the calculated spatial frequency components, and transforms the components passed through the high-pass filter to an image again. The high-pass filter filters the frequency components of the obtained luminance to leave only high frequency components at the predetermined frequency and higher, whereby the turbulence structure occurring in the fluid to be measured can be extracted from the fluid to be measured instead of capturing each one of particles reflected by natural light. The turbulence structure here is a cluster composed of a vortex or a flow structure similar to a vortex. By capturing the turbulence structure as a cluster as described above, each turbulence structure is captured across two or more pixels of the CCD image sensor to allow the analysis using the PIV method. In other words, the particle image used in the PIV method refers to an image of the turbulence structure in this embodiment.

In particular, each image signal of the taken image is subjected to Fourier transform or the like to obtain the spatial frequency component which is filtered using the high-pass filter. The spatial frequency f' in filtering by the high-pass filter is preferably determined within a range found by the following expression.

$$(St/D) \times 1/3 \leq f' \leq (St/D) \times 5 \quad (3)$$

(Incidentally, in the expression, "St" represents a Strouhal number, and "D" represents a representative length of an object generating a turbulence structure.)

Figure 5:
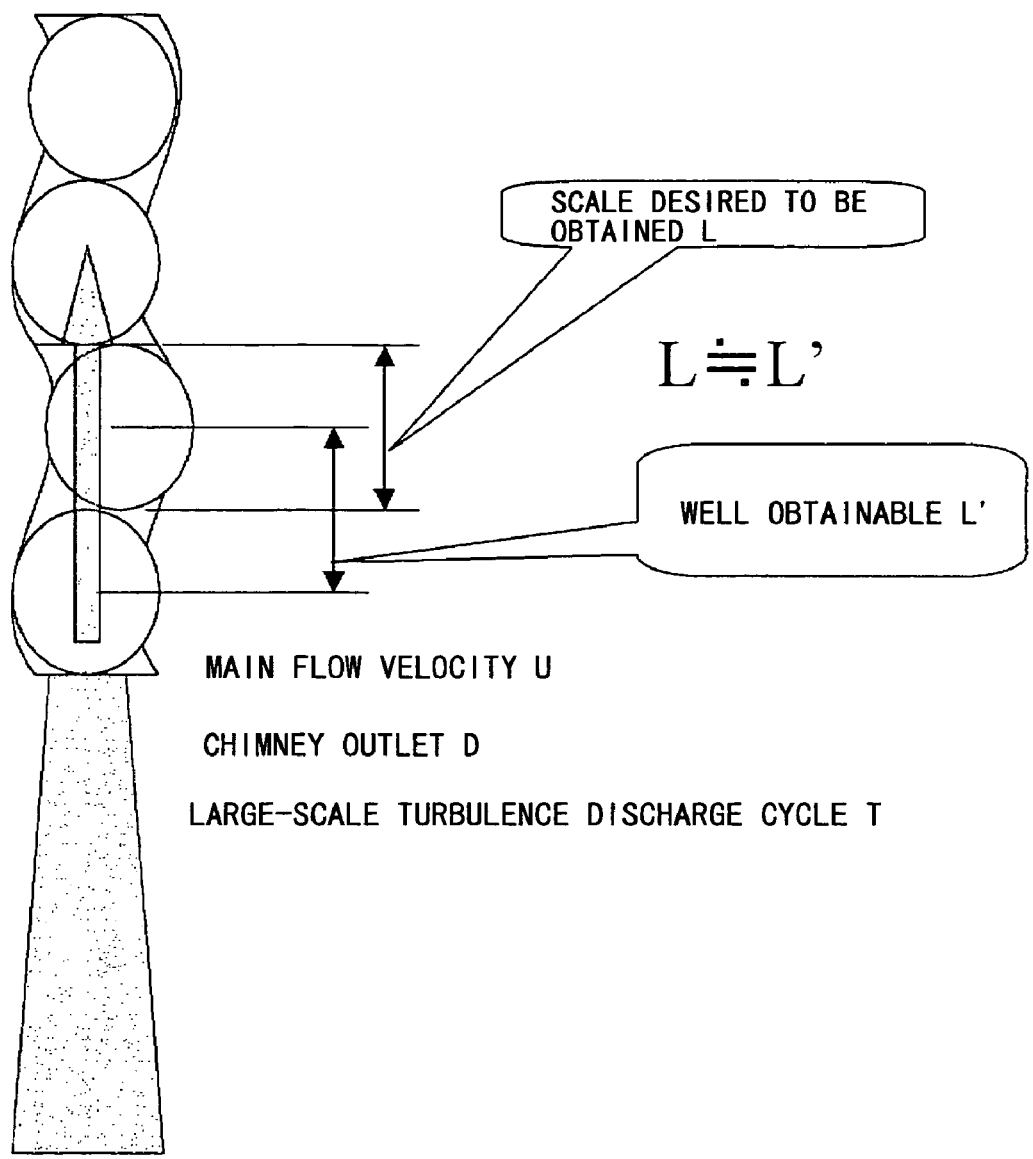
FIG. 5 is an illustration for explaining the way to obtain a spatial frequency at the time of filtering by a high-pass filter.

The spatial frequency f' here is an inverse number of the spatial wavelength L being the scale of a vortex of smoke exhausted from the chimney in the example shown in FIG. 5, but the spatial wavelength L cannot be directly found. On the other hand, the center-to-center distance L' of two contiguous vortexes can be found by the following expression.

$$L' = U \times T \quad (4)$$

(Incidentally, U represents the main flow velocity of smoke, and T represents the discharge cycle of a vortex)

Replacing this L' by the spatial wavelength, resulting in Spatial frequency f'=1/L'.

On the other hand, Strouhal number St=(1/T)×(D/U) leads to $$U = (1/T) \times (D/St) \quad (5).$$

Substituting the expression (5) into the expression (4) yields $$L' = D/St, \text{ that is, } f' = 1/L' = St/D \quad (6).$$

The value f' found by the expression (6) is the spatial frequency to be used in filtering. However, in extracting an effective turbulence structure, the spatial frequency is not limited to the value found by the expression (6) but can be determined within a range of ⅓ times or greater and 5 times or less of the f' value found by the expression (6), which will be the condition when the above-described expression (3) determines the spatial frequency f'.

According to the expression (3) (or the expression (6)), the special frequency f' can be easily found only with the representative length D of an object generating the turbulence structure and the Strouhal number St without obtaining the main flow velocity U and the discharge cycle T. The representative length D is, for example, the diameter of a chimney and thus its value can easily be found out, and the value of the Strouhal number St is known by experiments according to the shape of an object generating the turbulence structure (see, for example, Inoue and Kiya "Non-linear Phenomenon of Turbulence and Wave" (Asakura Publishing Co., Ltd. 1993) p. 162).

If a value smaller than the range of the above-described expression (3) is used as the spatial frequency f' in filtering, the image is close to the original image to fail to discriminate the turbulence structure, whereas if a larger value is used, the turbulence structure itself is also removed, both cases being undesirable.

Note that the turbulence structure extraction means preferably has means for applying Blackman window as pre-processing before each image signal of the taken image is subjected to Fourier transform. This brings the value at the edge portion of the reference region into zero so that the high frequency components are removed, whereby a decrease in analysis accuracy can be restrained. Blackman window means a window function having cosine waves of different cycles and is characterized by its very low side lobe level (see, for example, "Handbook of Image Analysis: Supervising Editors Mikio Takagi and Haruhisa Shimoda: University of Tokyo Press").

A. Simulation Test to Confirm Effectiveness of a Shield

The inventors found that if the optical telescope 3 constituting the long focus optical system 3 is configured such that its main mirror is provided with a shield for shielding a portion including the central portion of the mirror at an arbitrary shielding rate, at the time of taking the image of tracer particle, the image of one particle was enlarged with its contour kept clear, that is, not out of focus but in focus. Whether or not the above also applies to the case where the turbulence structure containing a plurality of particles in one pixel is captured was confirmed by the following simulation tests.

TEST EXAMPLE 1

Figure 6A:
FIG. 6A is an original image for simulation when luminance information of scattered light from a number of particles is recorded in one pixel of a CCD camera.
Figure 6B:
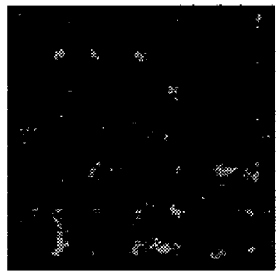
FIGS. 6B to 6D are images simulating the case when taken by the fluid measurement system.
Figure 6C:
Figure 6D:

Conditions of a Fluid Measurement System used in Calculation in the Simulation Test (a) Long Focus Optical System
   Aperture: 140 mm and Focal length: 2,000 mm (b) CCD Camera
   Size per pixel: 9 μm
   Measurement Simulation FIG. 6A is an original image for simulation when luminance information of scattered light from a number of particles is recorded in one pixel of the CCD camera 2 imaged through use of the above-described optical telescope from a distance of 20 m away. FIGS. 6B to 6D are images simulating the case where the above-described fluid measurement system 1 takes the images with the shield rate (center shield rate) by the shield being varied.

Figure 7A:
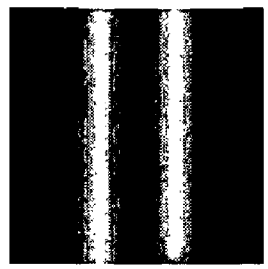
FIG. 7A is an original image of a parallel light source in which luminance information from a number of particles is recorded in one pixel similarly to FIG. 6A, and FIGS. 7B to 7E are images simulating the case when taken by the fluid measurement system.
Figure 7B:
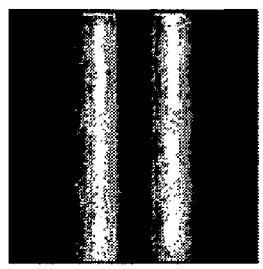
Figure 7C:
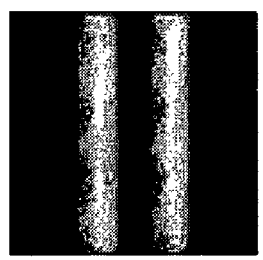
Figure 7D:
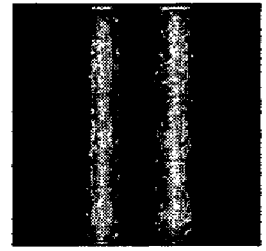
Figure 7E:
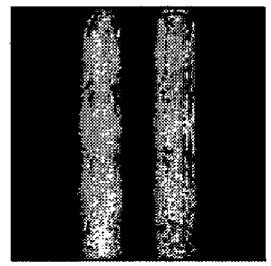

FIG. 7A is an original image of a parallel light source in which luminance information from a number of particles is recorded in one pixel of the CCD camera 2 similarly to FIG. 6A. FIGS. 7B to 7D are images simulating the case where the above-described fluid measurement system 1 takes the images with the center shield rate being varied. Note that FIG. 6B and FIG. 7B show the case of a center shield rate by the center shield of 0%, FIG. 6C and FIG. 7C show the case of a center shield rate of 35%, and FIG. 6D and FIG. 7D show the case of a center shield rate of 50%. Further, FIG. 7E is a simulation image in the case using a long focus optical system having an aperture of 70 mm and when the center shield rate is 0%.

As is clear from those drawings, when the number of particles in one pixel is plural, the image was blurred with increasing center shield rate. Thus, a lower shield rate of the shield is more preferable in the fluid measurement system 1 in this embodiment used for an ultra-long distance which extracts and measures the turbulence structure of the fluid to be measured. The shield rate is preferably 0% to 40%, more preferably, 0% to 20%, and most preferably 0%. However, comparing FIG. 7B and FIG. 7E, the image is clearer with increasing aperture of the long focus optical system.

B. Test of Analyzing the Actual Flow Field

The fluid to be measured was imaged via the long focus optical system 3 and a test of analyzing its flow field by the PIV method was carried out for each of the above-described fluid measurement systems 1.

TEST EXAMPLE 2

Configuration of the Fluid Measurement System 1

(a) Long Focus Optical System 3
   Maksutov-Cassegrain optical telescope (manufactured by ORION OPTICS, product name "OMI-140" (Aperture: 140 mm and Focal length: 2,000 mm))
   Note that at the time measurement, the focal length was adjusted to 1,260 mm using a reducer.
   Further, while a specific shield was not provided in front of the main mirror, but the center shield rate intrinsic to the aforementioned Maksutov-Cassegrain optical telescope was 33%.
   The aforementioned Maksutov-Cassegrain optical telescope was provided at the CCD camera 2, and the images of a graph paper and a scale were taken from positions 20 m and 50 m away therefrom and compared to confirm that there was no distortion in the images.

(b) CCD Camera 2
   Product name "MEGAPLUS ES1.0 (10-bit)" (manufactured by Redlake (size per pixel: 9 μm))

(c) Frame Grabber Board
   Product name "PIXCI-D2X" (manufactured by EPIX) (The digital image signal obtained by the CCD camera 2 is recorded on a hard disk of the computer 4 via the frame grabber board.)
   Measurement The fluid to be measured was exhaust smoke exhausted from the tip of the chimney of a thermal power station, and a fluid measurement system 100 was set at a position 7.8 km away from the fluid to be measured. Under the sunlight, its image was taken at the imaging time interval $\Delta t = 1/30$ s. Each of the obtained image signals at two time points was subjected to Fourlier transform to obtain the spatial frequency components, and the high-pass filter was used for the spatial frequency components to leave only high frequency components at a predetermined frequency and higher to thereby extract the turbulence structure. In the case of this test example, as for the representative length D of the aforementioned expression for use in determining the frequency f' to be filtered, the diameter of the discharge port of the chimney tip was 10 m, and the Strouhal number St was set to 0.4 from a general numeral value in analysis of flow (see, for example, Inoue and Kiya "Non-linear Phenomenon of Turbulence and Wave" (Asakura Publishing Co., Ltd. 1993) p. 162), with the result that f' was 0.04 (1/m). The image of the turbulence structure was subjected to analysis processing by the cross-correlation method in the image processing means 43.

Figure 10:
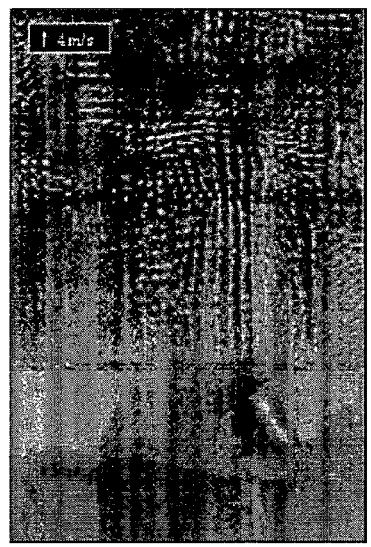
FIG. 10 is a view showing the appearance of a flow field of the fluid to be measured in Test Example 2.

FIG. 8 is an original image of exhaust smoke being the fluid to be measured in this test example. FIG. 9 is an image of the turbulence structure showing the resulting original image filtered by the high-pass filter and then inversely transformed. FIG. 9 shows that filtering processing by the high-pass filter extracts the turbulence structure. FIG. 10 is a view showing the appearance of flow field of the fluid to be measured by vectors using the images at two time points obtained in a manner of FIG. 9. As shown in FIG. 10, the moving amount and the moving direction of the exhaust smoke could be taken in a sufficient luminance by the method of this test example.

Figure 11:
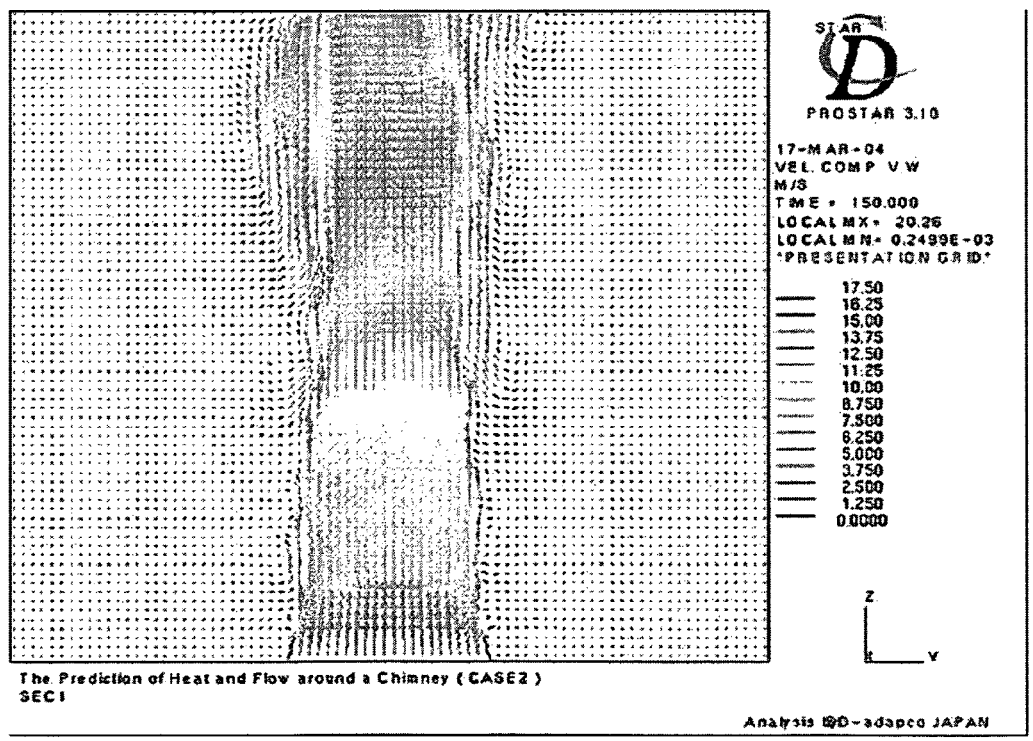
FIG. 11 is a simulation diagram of exhaust smoke under the same conditions as those of Test Example 2.

For comparison, simulation was performed using the numeral value analysis code "STAR-CD (trade name)" under the same conditions as those of the exhaust smoke measured as described above. The simulation result is shown in FIG. 11. Comparing FIG. 10 with FIG. 11, the shapes and velocity vectors of rising exhaust smokes well matched each other. Further, the flow rate of the exhaust smoke exhausted from the chimney obtained from FIG. 10 substantially matched the operating flow rate at the thermal power station. Accordingly, it is obvious that the measure system used in this test example is suitable for measurement of the flow field in an ultra-long distance such as a distance to the fluid to be measured of 7.8 km.

In analyzing the flow field of the fluid to be measured using the long focus optical system of the present invention, the system has a characteristic when taking images outdoors that unnecessary background (a mountain, building or the like) is projected in the image taken by the CCD camera 2. Hence, in this case, it is preferable to set a difference calculation means as the pre-processing means before the image processing means processes the image.

Figure 12:
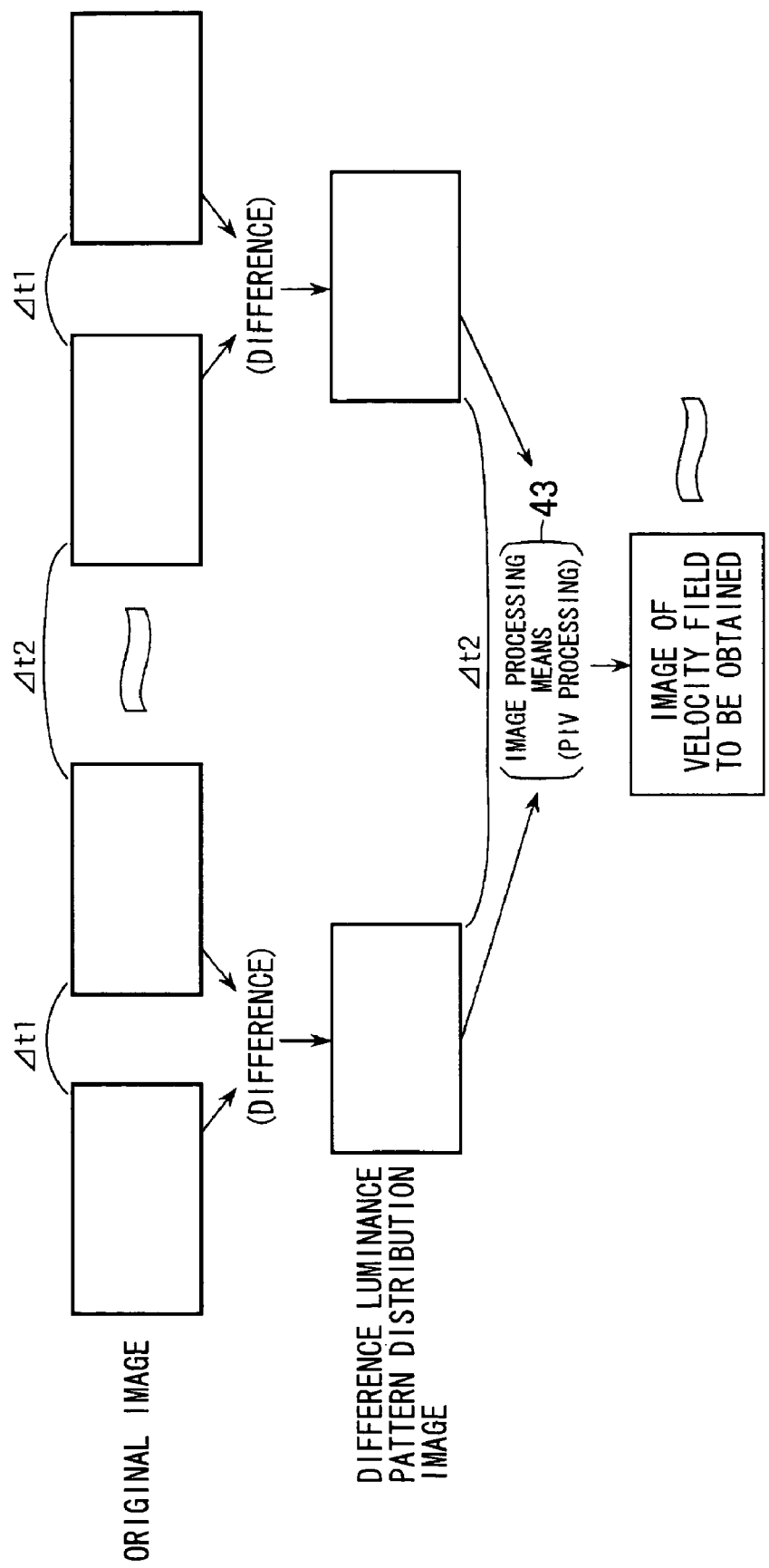
FIG. 12 is a conceptual diagram for explaining one example of a difference calculation means.

The difference calculation means repeats, for example, taking a pair of images at two consecutive time points at a time interval of Δt1 and taking again a pair of images at two consecutive time points at a time interval of Δt1, with a time of Δt2 intervening therebetween, to thereby take a plurality of pairs of images at a time interval of Δt1 at two time points. Then, as shown in FIG. 12, the difference between the images at the two consecutive time points in each pair is obtained. As a result, the same image signal on the same pixel is cancelled. In other words, the image signal of the background which is projected in the two images but never moves is cancelled, and as a result, only the image of the moved turbulence structure is left. The image obtained by the difference calculation means as described above is regarded as a difference luminance pattern distribution, so that two difference luminance pattern distribution images with a time of Δt2 intervening therebetween are obtained and processed by the image processing means 43. This ensures that the image signal of the background does not interfere with image processing to increase the accuracy of the flow field analysis of the fluid to be measured.

Figure 13:
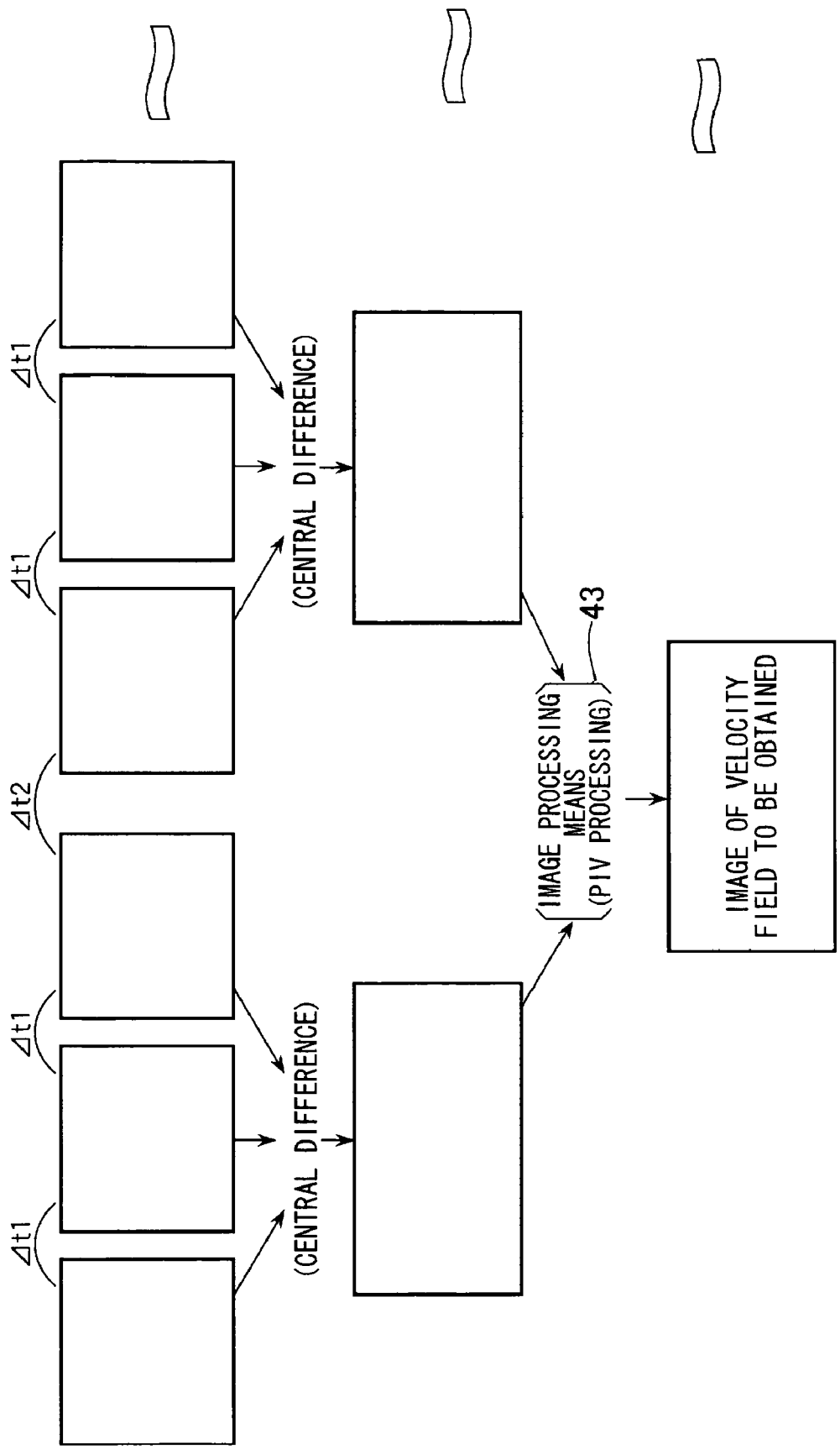
FIG. 13 is a conceptual diagram for explaining another example of the difference calculation means.
Figure 14:
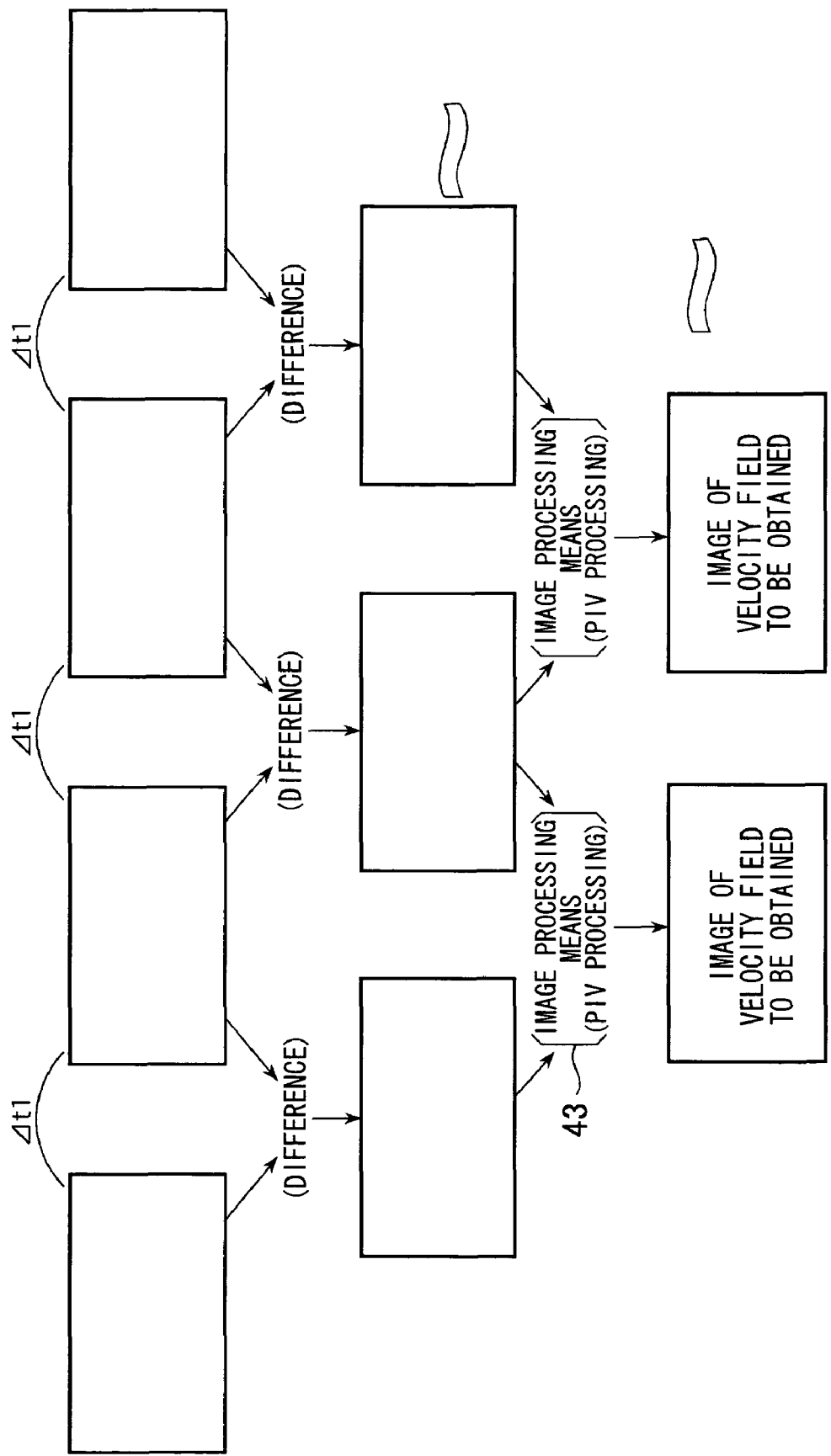
FIG. 14 is a conceptual diagram for explaining still another example of the difference calculation means.

The difference calculation means may be, in addition to the above, means for taking a plurality of sets of images at three consecutive time points at a time interval of Δt1, obtaining the central difference in each of the sets, and using the difference luminance pattern images obtained from the central differences as shown in FIG. 13. Further, as shown in FIG. 14, it is also possible to employ means for sequentially taking images at a consecutive plurality of time points at a time interval of Δt1, and sequentially obtaining the difference luminance pattern distribution images between the images at two consecutive time points.

Besides, at the time of imaging a distant fluid to be measured a long distance away, the depth of field is large even if the CCD 2 is in focus. Therefore, the accuracy when reproducing the velocity vectors of the turbulence structure on the two dimensional coordinates is lower than that of the case where the fluid to be measured at a short distance such as about 1 m is imaged. Hence, to obtain more accurate two-dimensional velocity vectors, it is preferable to prepare three CCD cameras 2 and to use means for imaging the same fluid to be measured in three directions. For example, with respect to a line connecting the central CCD camera and the fluid to be measured, other two CCD cameras are set at positions separated at predetermined angles α1 and α2 on the right and left. The image processing means 43 first processes the images obtained from the respective cameras to obtain the velocity vectors. Then, using the angles α1 and α2 and the distances from the right and left CCD cameras to the fluid to be measured, the image processing means 43 performs coordinate transformation of the velocity vectors obtained by processing the images obtained by the right and left CCD cameras to the velocity vectors obtained when taking an image at the position of the central CCD camera. Then, the coordinate-transformed velocity vectors of the right and left images are compared to the velocity vectors of the image taken by the central CCD camera to extract only the overlapping velocity vectors of the turbulence structure. Consequently, more accurate two-dimensional velocity vectors can be obtained even for the case of a larger depth of field.

INDUSTRIAL AVAILABILITY

From the above, in the present invention, an image is taken using the long focus optical system, and the obtained image is processed using the PIV method, whereby the flow field of an inaccessible distant fluid to be measured can be analyzed. Accordingly, the present invention can be used, for example, for operation control at the power station by analyzing the flow field of smoke from a chimney, for operation control by analyzing the flow field of water vapor from a cooling tower of the atomic power station or the geothermal power station, for environmental impact evaluation by analyzing the flow field of volcanic ash and yellow sand, and so on. Further, it is possible to analyze the flow field of smoke generated from a large-scale fire site to contribute the analysis to countermeasure, evacuation guidance, and so on. Further, by allowing the laser light to be inputted into the distant fluid to be measured, airflow can also be analyzed. In addition, analysis of the flow field of crowd (crowd base portion) can be utilized for local weather forecast and even for analysis of wind around power transmission lines or transmission towers and for measurement of flow of pollen. Furthermore, for volcano eruption or large-scale fire, the fluid measurement system of the present invention can be mounted on a vehicle to analyze the flow field while moving so as to help grasp the disaster occurrence state on real time and take effective countermeasure against disaster. Note that the distance from the long focus optical system to the fluid to be measured is different depending on the accuracy of the long focus optical system and the image sensor in use. The distance is preferably, but not especially limited to, 10 m or greater and 20 km or less for practical use in consideration of the performance of the available long focus optical system and so on. In particular, the present invention is for extracting the turbulence structure to obtain the velocity vectors of the turbulence structure, and is thus suitable for an ultra-long distance such as 1 km or greater and 20 km or less among others.

The invention claimed is:

1. A fluid measurement system, comprising:
    an imaging means for taking images of particles contained in a fluid to be measured at small time intervals, said imaging means comprising a long focus optical system being of a long distance type that images a fluid to be measured a long distance away;
    an image processing means for comparing luminance pattern distributions at a plurality of consecutive time points obtained by said imaging means to measure a moving direction and a moving amount of a particle group, and analyzing a flow field of the fluid to be measured; and
    a turbulence structure extraction means for extracting a turbulence structure of the fluid to be measured from the particle images obtained by said imaging means, wherein said image processing means measures a moving direction and a moving amount of the extracted turbulence structure to analyze the flow field of the fluid to be measured.

2. The fluid measurement system according to claim 1, wherein
    said turbulence structure extraction means comprises a spatial frequency transformation means for transforming the image taken by said imaging means to spatial frequency components of luminance, a high-pass filter for leaving high frequency components at a predetermined frequency and higher from the transformed frequency components, and an image transformation means for transforming the frequency components after the filtering processing by said high-pass filter to an image.

3. The fluid measurement system according to claim 2, wherein
    said turbulent extraction means further comprises means for applying a window function to a signal of the image taken by said imaging means.

4. The fluid measurement system according to claim 3, wherein
Blackman window is used as the window function.

5. The fluid measurement system according to any one of claim 1 to claim 4, further comprising:
a difference calculation means for obtaining, from the luminance pattern distributions at the plurality of consecutive time points obtained by said imaging means, a difference between the luminance pattern distributions at the plurality of consecutive time points as a difference luminance pattern distribution,
wherein said image processing means analyzes the flow field of the fluid to be measured using the difference luminance pattern distributions at a plurality of consecutive time points obtained by said difference calculation means.

6. The fluid measurement system according to claim 1, wherein
said imaging means is of a long distance type that images a luminance pattern distribution by natural light reflection in the fluid to be measured a long distance away.

7. The fluid measurement system according to claim 1, further comprising:
a laser light input means for inputting a laser light in a sheet form into the fluid to be measured,
wherein said imaging means is of a long distance type that images a luminance pattern distribution by the laser light reflection in the fluid to be measured a long distance away.

8. The fluid measurement system according to claim 1, wherein
said imaging means is of a long distance type that images the fluid to be measured 10 m or greater and 20 km or less away from the set position of said imaging means.

9. A fluid measurement method, comprising:
taking images of particles contained in a fluid to be measured a long distance away at small time intervals by an imaging means comprising a long focus optical system,
comparing luminance pattern distributions of particle images at a plurality of consecutive time points obtained by the imaging means to measure a moving direction and a moving amount of a particle group;
analyzing a flow field of the fluid to be measured from the moving direction and the moving amount of the particle group; and
extracting a turbulence structure of the fluid to be measured and measuring the moving direction and the moving amount of the extracted turbulence structure to analyze the flow field of the fluid to be measured, when the number of particles contained in one pixel of the particle image obtained by the imaging means is plural.

10. The fluid measurement method according to claim 9, wherein
said extracting a turbulence structure of the fluid to be measured comprises transforming the image taken by the imaging means to spatial frequency components of luminance, performing filtering processing to leave high frequency components at a predetermined frequency and higher from the transformed frequency components, and transforming the frequency components after the filtering processing to an image.

11. The fluid measurement method according to claim 10, wherein
said extracting a turbulence structure of the fluid to be measured further comprises applying a window function to a signal of the image taken by said imaging means.

12. The fluid measurement method according to any one of claim 9 to claim 11, further comprising:
imaging a luminance pattern distribution by natural light reflection in the fluid to be measured, and analyzing the flow field of the fluid to be measured.

13. The fluid measurement method according to claim 9, further comprising:
inputting a laser light in a sheet form into the fluid to be measured, imaging a luminance pattern distribution by the laser light reflection in the fluid to be measured, and analyzing the flow field of the fluid to be measured.

14. The fluid measurement method according to claim 9, further comprising:
imaging the fluid to be measured 10 m or greater and 20 km or less away from the set position of the imaging means, and analyzing the flow field of the fluid to be measured.

15. The fluid measurement method according to claim 9, further comprising:
analyzing the flow field of smoke, volcanic ash, water vapor, yellow sand, crowd, pollen or air 10 m or greater and 20 km or less away from the set position of the imaging means, as the fluid to be measured.

16. A fluid measurement system, comprising:
a camera configured to take images of particles contained in a fluid to be measured at small time intervals, said camera comprising a long focus optical system being of a long distance type configured to image a fluid to be measured a long distance away; and
a computer including an image processor configured to compare luminance pattern distributions at a plurality of consecutive time points obtained by said camera to measure a moving direction and a moving amount of a particle group, and analyze a flow field of the fluid to be measured and a turbulence structure extractor configured to extract a turbulence structure of the fluid to be measured from the particle images obtained by said camera, wherein said image processor measures a moving direction and a moving amount of the extracted turbulence structure to analyze the flow field of the fluid to be measured.

* * * * *